United States Patent
Kim

(10) Patent No.: US 7,151,486 B2
(45) Date of Patent: Dec. 19, 2006

(54) GPS NAVIGATION WITH INTEGRATED PHASE TRACK FILTER

(75) Inventor: Paul Y. Kim, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 30 days.

(21) Appl. No.: 10/890,236

(22) Filed: Jul. 14, 2004

(65) Prior Publication Data
US 2006/0015250 A1  Jan. 19, 2006

(51) Int. Cl.
*G01S 1/00* (2006.01)
(52) U.S. Cl. .................... 342/357.06; 701/213
(58) Field of Classification Search .......... 342/357.02, 342/357.06, 357.07, 357.14; 701/207, 213, 701/214
See application file for complete search history.

(56) References Cited

U.S. PATENT DOCUMENTS

| | | | | |
|---|---|---|---|---|
| 5,721,555 A | * | 2/1998 | Lennen | 342/357.12 |
| 5,787,384 A | * | 7/1998 | Johnson | 701/216 |
| 5,867,411 A | * | 2/1999 | Kumar | 708/300 |
| 6,278,945 B1 | * | 8/2001 | Lin | 701/216 |
| 2003/0132878 A1 | * | 7/2003 | Devereux et al. | 342/357.06 |
| 2005/0234644 A1 | * | 10/2005 | Lin | 701/214 |

OTHER PUBLICATIONS

Hyung Keun Lee, et al., *Position Domain Filtering and Range Domain Filtering for Carrier-Smoothed-Code DGNSS: An Analytical Comparison*, IEEE Proceedings—Radar, Sonar and Navigation, Jan. 2003.

P. Vaníček, et al., *Does A Navigation Algorithm Have To Use Kalman Filter?*, CASI Journal, vol. 45, No. 3, 1999, p. 292-296, Canadian Aeronautical and Space Institute (CASI), Ottowa, Ont., Canada.

* cited by examiner

*Primary Examiner*—Dao Phan
(74) *Attorney, Agent, or Firm*—Buchanan Ingersoll & Rooney, PC

(57) ABSTRACT

An exemplary method for ultra-tight or deep-integrated tracking signals, transmitted from satellites and containing digital codes, includes a receiver receiving first and second signals transmitted by a satellite, and tracking the first and second signals with one integrated filter. The integrated filter tracks range error, range error rate, range error acceleration, a carrier integer ambiguity of the first signal, a carrier integer ambiguity of the second signal, an ionospheric delay error, and optionally an ionospheric delay error rate.

6 Claims, 2 Drawing Sheets

GPS NAVIGATION WITH INTEGRATED PHASE TRACK FILTER

BACKGROUND

As more weapon and fire-control systems become dependent on GPS (Global Positioning System) for their accuracy and effectiveness, it becomes important for GPS receivers to be able to withstand RF (Radio Frequency) signal interferences, especially under a highly dynamic engagement scenario. The RF interference can adversely affect GPS receiver code and carrier tracking, resulting in degraded and unsatisfactory navigation performance.

In essence, a GPS system receiver determines its terrestrial location by triangulating its position relative to GPS satellites in orbit around the earth, by receiving signals transmitted from the satellites, measuring the travel times of the signals from the satellites to the receiver, and then calculating the distances of the satellites from the receiver based on the travel time. To measure the travel time, very accurate timing is necessary—the GPS satellites carry atomic clocks. The receiver also needs to know the exact positions of the GPS satellites. In addition, for further accuracy the receiver must compensate for atmospheric effects on travel time of the satellite signals to the receiver.

One basic function of a GPS receiver is to generate replica signals that can be correlated with the received satellite signals. Each GPS satellite can have a unique digital code sequence (e.g. a Pseudo Random Code) that is by analogy similar to a musical tune, so that the GPS receiver can distinguish signals from different GPS satellites. The GPS receiver knows the "tunes" or code sequences of the different GPS satellites, knows when the "tunes" are to be transmitted, and knows where the GPS satellites should be.

Upon receiving a code signal, the GPS receiver identifies the signal, generates a replica of the code signal, and seeks to "hum along" or synchronize the replica signal with the received code, and thereby track the received signal. This signal tracking includes two fundamental functions: code-phase tracking to track digital codes of received satellite signals, and carrier-phase tracking to track the carrier signals that are conveying the digital codes. When the receiver is receiving a code signal from a GPS satellite and the receiver's clock is synchronized with the clock onboard the satellite, then an amount of time that the receiver must delay the code replica signal to synchronize or correlate it with the received code signal, is the amount of time it takes the received signal to travel from the satellite to the receiver. The receiver can use this time interval to determine a geographic distance between the satellite and the receiver. Signals from four or more different GPS satellites enable the receiver to synchronize its clock with the clocks onboard the satellites.

GPS satellites operated by the U.S. military transmit two different signals on two different carrier frequencies. The first carrier frequency, L1, has a frequency of 1575.42 MHz and carries two pseudo random digital codes as well as a status message (containing, for example, supplemental information regarding the satellite's orbit, the accuracy of its clock, and so forth). The first digital code on L1 is called a C/A (Coarse Acquisition) code. The U.S. military makes the C/A code for each U.S. GPS satellite known and available to the public sector. The C/A code repeats every 1023 bits, and modulates the L1 carrier frequency at a 1 MHz rate. The second carrier frequency, L2, has a frequency of 1227.60 MHz. In addition to the C/A codes transmitted on the L1 carrier frequency of the U.S. GPS satellites, a P(Y) code ("P" for precise, and "(Y)" when the code is encrypted) is also broadcast from each satellite on both the L1 and L2 carrier frequencies. The P(Y) codes are intended for exclusive use by the military. Each P(Y) code repeats on a 7-day cycle and modulates both the L1 and L2 carrier frequencies at a 10 MHz rate. Transmission of codes on two different carrier frequencies also allows military receivers to estimate atmospheric effects based on the different refractive effects that the atmosphere has on the two different carrier frequencies.

Because of the digital nature of the codes, the replica code signal generated by a GPS receiver and the code signal received by the GPS receiver from one of the GPS satellites can be out of phase by an amount approaching the width of an individual code pulse and still be synchronized at least part of the time. Note that during the time duration of a single chip of the commercial C/A code output by U.S. GPS satellites, light can travel approximately 293 meters. Since the carrier frequency that conveys the code signal is generally much higher than the chip frequency of the code signal (e.g. by three orders of magnitude), the uniform cycles of the carrier frequency can be used to further synchronize the replica code signal with the received code signal and bring the rising (or falling) edges of the replica code signal and received code signal closer together.

When correlating the predicted code and carrier replica signals to the received signals from the satellites, GPS receivers generate error-signals as part of the tracking process. Traditionally, GPS receivers are designed to perform the tracking process internally with code and carrier tracking loop implementations.

In code tracking, a receiver attempts to minimize the correlation error by advancing and delaying the replica code to synchronize the replica code with the received code. A typical carrier loop is designed to zero-out the carrier phase or frequency errors by applying a correction to the carrier replica oscillator to advance or delay the replica code. Specifically, the tracking errors are sent to a numerically controlled oscillator (NCO) to advance or retard the receiver generated replica signals. When the track errors are near zero, the receiver is said to be in "code-lock" or "carrier-lock". When the signal is in lock, GPS measurements (pseudo-range and delta-range) can be mathematically generated for navigation filter updates.

The GPS system can be used in conjunction with an INS (Inertial Navigation System) so that the two systems complement each other. Accurate GPS data can be used to supplement or correct INS data. For example, Kalman filtering is used in known implementations to harmonize or correct INS measurements with GPS satellite range and range-rate information. On the other hand, the INS system can aid in tracking operations of the GPS system by smoothly providing accurate short-term measurements of acceleration and velocity that can be used to assist or supplement GPS code tracking and carrier tracking. Aid from the INS system can be useful, for example, when GPS tracking is degraded or jeopardized due to GPS signals suffering interference due to jamming and/or other phenomena including multipath reception, physical blocking of the GPS signals (e.g. by a forest canopy or other structure), and so forth. Interference effects can be compounded with Doppler effects, for example varying Doppler effects due to maneuvering of the GPS receiver.

In order to track signals in the line-of-sight (LOS) domain under non-ideal dynamic situations, a receiver needs to be compensated for receiver-satellite relative motion and receiver oscillator errors. Traditionally, most GPS-inertial navigation systems are equipped with inertial-aiding for this compensation. This scheme is called "loosely-coupled" or "tightly-coupled" integration, depending on the bandwidth of inertial-aiding loops and their implementations. Both are based on traditional track loop implementations in receiver architecture. Although they rely on data from the inertial measurement unit to aid or assist the GPS, they provide limited immunity against momentary GPS signal outages or high interference levels (low signal-to-noise ratio) with GPS signals due to the time-delay of aiding data from the inertial system and less than optimal inter-loop implementations.

If the track loop error exceeds a threshold level, the tracking loop can lose its lock on the satellite signal and must "reacquire" the signal. This track-reacquisition process is independently implemented for each channel (e.g. the CA code for each satellite) without using information from other good channels. Furthermore, since a higher signal-to-noise ratio is required for the signal reacquisition process, the signal might not be reacquired without sufficient improvement in conditions adversely affecting GPS lock.

Recently, numerous organizations have actively engaged in development of integration schemes called "ultra-tightly coupled integration" or "deeply-integrated system". These implementations do not utilize GPS signals in usual sense. The idea is to employ the navigation filter of the INS as a part of the GPS track loop. The navigation filter, provided with high rate IMU (Inertial Measurement Unit) data, can use the raw GPS receiver outputs, in-phase (I) and quadrature-phase (Q) data, and deliver direct aiding data (NCO) to the GPS receiver (e.g., to a numerically controlled oscillator of the receiver) at a track-loop bandwidth by estimating latest GPS receiver antenna position, velocity, and oscillator bias. Since the correlators' I and Q directly reflect the navigation filter measurement residuals, they are the range domain projections of the navigational (position and velocity) errors and receiver clock bias since the previous filter update. Utilizing the characteristics of I and Q, the navigation filter replaces the conventional track-loop filters. The existing approaches of this ultra-tight system implementation can be implemented via either a) single step, centralized non-linear filtering or b) two step, cascaded or federated filtering.

The centralized filtering combines correlation-track and navigation filters. The navigation filter essentially is part of the signal error track loops providing the latest corrections for pseudo-ranges and pseudo-range rates of all GPS satellites in view of the GPS receiver. This non-linear Kalman filtering approach includes a high computational burden because the filter needs to be updated at a high frequency (e.g. 50 Hz).

The cascaded filtering approach uses two independent filters, a pre-filter and a navigation filter. The pre-filter estimates GPS carrier and code phase errors at high frequency (50 Hz). To follow high dynamics of the errors, their rates and accelerations also need to be estimated. The estimates of the code-phase errors and carrier-phase error rates are then used as measurement residuals in the navigation filter at a slow rate (e.g., 1 Hz). In military applications a pre-filter is independently implemented for each satellite and both L1/L2 carrier frequencies. This large number of the pre-filters (two per satellite) also results in a high computational burden.

In addition, both the cascaded filtering and the centralized filtering approaches require estimation of ionospheric delays to improve the positional accuracy. These delays are usually filtered using dual-frequency measurements (e.g. with respect to the different carrier frequencies L1 and L2 and their different refractive properties), which requires another independent filter for each satellite.

SUMMARY

An exemplary method for tracking signals transmitted from satellites and containing digital codes, includes a receiver receiving first and second signals transmitted by a satellite, and tracking the first and second signals based on range error, range error rate, range error acceleration, a carrier integer ambiguity of the first signal, a carrier integer ambiguity of the second signal, an ionospheric delay error, and (optionally) an ionospheric delay error rate.

An exemplary embodiment includes a satellite signal tracker having at least one clock circuit arranged to synchronize a received satellite signal with a replica signal, a first filter arranged to filter a received satellite signal, wherein the first filter has states corresponding to range error, range error rate, range error acceleration, carrier integer ambiguity of the first signal, carrier integer ambiguity of the second signal, ionospheric delay error, and (optionally) ionospheric delay error rate, and a feedback circuit arranged to adjust the clock circuit based on data output from the first filter.

DETAILED DESCRIPTION

In accordance with exemplary embodiments, a new set of algorithms for an ultra-tight integration of GPS (Global Positioning System) and INS (Inertial Navigation System) systems are provided, resulting in an improved technique for two-step cascaded (federated) filtering. In particular, exemplary embodiments include one integrated filter per satellite that simultaneously handles L1 signal tracking, L2 signal tracking, and ionospheric delay estimation. The integrated filter includes a GPS-signal error estimator or phase track filter that provides direct estimates of: pseudo-range error; pseudo-range error rate; pseudo-range error acceleration; L1 and L2 carrier-phase track ambiguities (e.g., L1 carrier integer ambiguity, and L2 carrier integer ambiguity); frequency-independent ionospheric delay error; and frequency-independent ionospheric delay error rate. In accordance with exemplary embodiments, only one filter is required for each satellite to estimate the GPS signal residuals for an ultra-tight GPS/INS navigation system.

Figure 1:
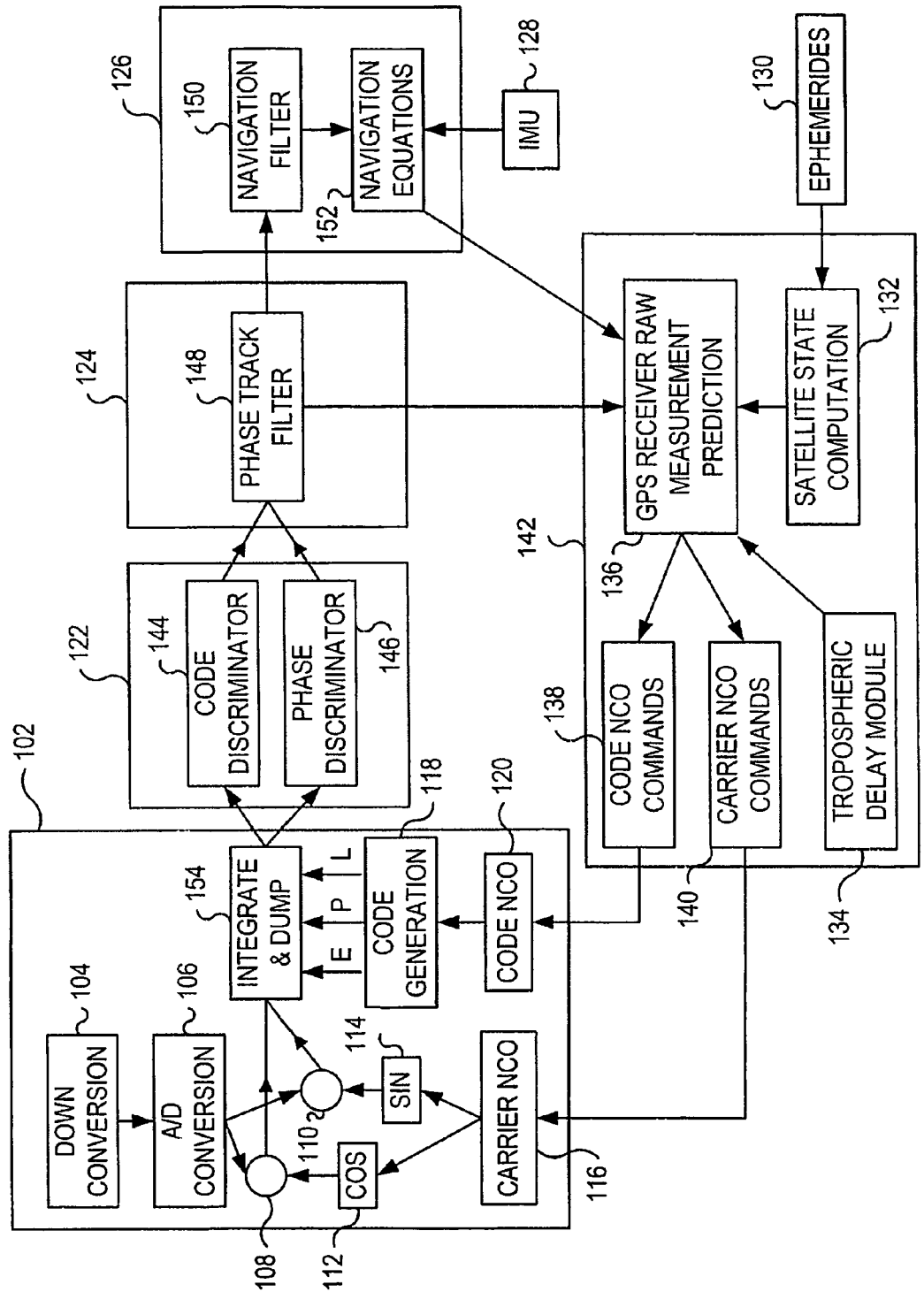
FIG. 1 illustrates an exemplary embodiment.

FIG. 1 illustrates an ultra-tight GPS/INS or GPS/IMU (Inertial Measurement Unit) integration in accordance with exemplary embodiments. The navigation processing includes three basic functions or modules: a Code/Carrier Phase Error Discrimination module 122; a 7-State Code/Carrier Phase Track Filter module 124; and a Navigation Functions (Equation and Filter) module 126. Also included are a Tropospheric Delay Estimator module 134, a GPS Receiver Raw Measurement Prediction module 136, a Code NCO Command Computation module 138, and a Carrier NCO Command Computation module 140.

As shown in FIG. 1, a GPS receiver processing module 102 includes a down conversion module 104 that down converts the received radio signals and provides them to an A/D (Analog to Digital) conversion module 106, which in turn provides outputs that are combined (108, 110) with sin and cosine signals 114, 112 generated by a carrier NCO (Numerically Controlled Oscillator) 116. The combined signals are provided to an integrate-and-dump module 154. The integrate-and-dump module 154 also receives signals from a code generation module 118, that in turn is clocked by a code NCO 120. Output of the GPS receiver module 102, in particular output of the integrate-and-dump module 154, is provided to a phase error discriminator module 122 that includes a code discriminator module 144 and a phase discriminator module 146. Output of the integrate-and-dump module 154 includes $I_E$, $Q_E$, $I_P$, $Q_P$, $I_L$, $Q_L$ for each of L1, L2.

Outputs of the discriminator modules 144,146 are provided to a seven-state pre-filter or phase track filter module 124 that including a phase track filter 148. The seven states include (pseudo) range error, (pseudo) range error rate, (pseudo) range error acceleration, L1 carrier integer ambiguity, L2 carrier integer ambiguity, ionospheric delay error, and ionospheric delay error rate. The phase track filter 148 supplies range error and range error rate to the navigation functions module 126, in particular to a navigation filter 150 within the module 126. The phase track filter 148 also provides filtered data, including ionospheric delay error and ionospheric delay error rate, to a LOS dynamics prediction module 142, and in particular to GPS receiver raw measurement prediction module 136 within the module 142.

The navigation filter 150 provides its output to a navigation equations module 152 within the navigation functions module 126 to compensate navigation and IMU errors. The navigation filter 150 also sends the GPS receiver clock errors to the dynamic prediction module 142, in particular to the GPS receiver raw measurement prediction module 136. The navigation equations module 152 also receives inertial measurement signals from an IMU (Inertial Measurement Unit) 128. The dynamics prediction module 142 further includes a tropospheric delay model module 134 and a satellite vehicle state computation module 132, which also provide data (a tropospheric delay estimate, and status data regarding the satellite in question, respectively) to the GPS receiver raw measurement prediction module 136. The satellite state module 132 receives ephemerides data from a module 130. The GPS receiver raw measurement prediction module 136 processes the data received from the filter 148, the navigation equations module 152, the satellite state computation module 132, and the tropospheric delay model module 134 and outputs error data to code NCO and carrier NCO command modules 138,140 within the dynamics prediction module 142. The code NCO command module 138 computes commands necessary to adjust or correct the code NCO 120 in the GPS receiver processing module 102 based on the error data, and the carrier NCO command module 140 likewise computes commands necessary to adjust or correct the carrier NCO 116 in the GPS receiver processing module 102 based on the error data.

In an exemplary embodiment, the GPS receiver processing module 102, the phase error discrimination module 122, and the filter module 124 output data at a rate of 50 Hz, and the NCO commands modules 138,140 output data or commands at a rate of 100 Hz.

With respect to GPS code/carrier phase error discrimination, the typical GPS receiver generates I (in-phase) and Q (quadrature) measurements of Early, Prompt, and Late correlations with the equations 1 and 2 expressed below:

$$I = d \cdot \text{Corr}(\delta\rho) \cdot \cos(\delta\phi_l) + n_I \quad (1)$$

$$Q = d \cdot \text{Corr}(\delta\rho) \cdot \sin(\delta\phi_l) + n_Q \quad (2)$$

where
d=GPS navigation data;
δρ=range error;
$\delta\phi_l$=replicated carrier phase error of $L_1$ or $L_2$ carrier frequencies;
n=noise; and
Corr(δρ)=code correlation function.

Figure 2:
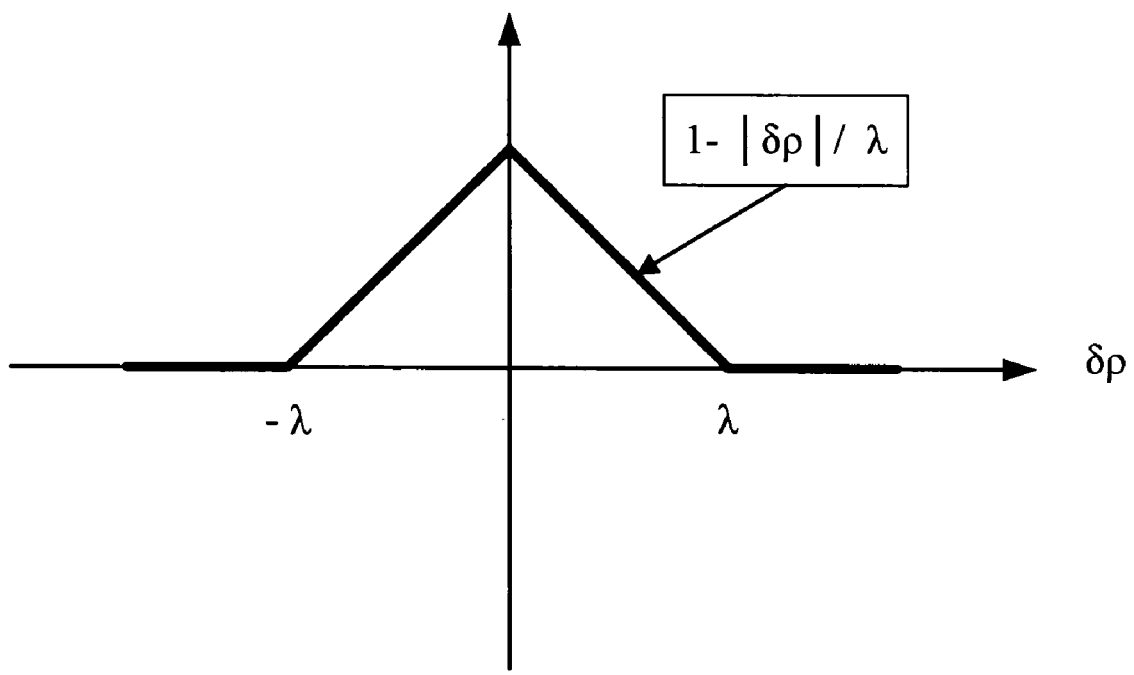
FIG. 2 illustrates a code correlation function.

FIG. 2 illustrates a general code correlation function. Note that the wavelengths of the P(Y) and C/A codes can be calculated as follows:

(3)

$$\lambda_{PY} = c/\omega_{PY}$$
$$= (2.998 \times 10^8 \text{ meters/chip})/(10.23 \times 10^6 \text{ chip/second})$$
$$= 29.310 \text{ meters/chip}$$

(4)

$$\lambda_{CA} = c/\omega_{CA}$$
$$= (2.998 \times 10^8 \text{ meters/chip})/(1.023 \times 10^6 \text{ chip/second})$$
$$= 293.06 \text{ meters/chip}$$

where "c" is the speed of light.

L1 and L2 frequency measurements can be performed in accordance with the following equations, where "B" is the code chip length.

With respect to L1, for each satellite:

$$I_{P_1} = d \cdot \text{Corr}(\delta\rho) \cdot \cos(\delta\phi_1) + n_{IP_1} \quad (5)$$

$$Q_{P_1} = d \cdot \text{Corr}(\delta\rho) \cdot \sin(\delta\phi_1) + n_{QP_1} \quad (6)$$

$$I_{E_1} = d \cdot \text{Corr}(\delta\rho) \cdot \cos(\delta\phi_1 + B/2) + n_{IE_1} \quad (7)$$

$$Q_{E_1} = d \cdot \text{Corr}(\delta\rho) \cdot \sin(\delta\phi_1 + B/2) + n_{QE_1} \quad (8)$$

$$I_{L_1} = d \cdot \text{Corr}(\delta\rho) \cdot \cos(\delta\phi_1 - B/2) + n_{IL_1} \quad (9)$$

$$Q_{L_1} = d \cdot \text{Corr}(\delta\rho) \cdot \sin(\delta\phi_1 - B/2) + n_{QL_1} \quad (10)$$

With respect to L2, for each satellite:

$$I_{P_2} = d \cdot \text{Corr}(\delta\rho) \cdot \cos(\delta\phi_2) + n_{IP_2} \quad (11)$$

$$Q_{P_2} = d \cdot \text{Corr}(\delta\rho) \cdot \sin(\delta\phi_2) + n_{QP_2} \quad (12)$$

$$I_{E_2} = d \cdot \text{Corr}(\delta\rho) \cdot \cos(\delta\phi_2 + B/2) + n_{IE_2} \quad (13)$$

$$Q_{E_2} = d \cdot \text{Corr}(\delta\rho) \cdot \sin(\delta\phi_2 + B/2) + n_{QE_2} \quad (14)$$

$$I_{L_2} = d \cdot \text{Corr}(\delta\rho) \cdot \cos(\delta\phi_2 - B/2) + n_{IL_2} \quad (15)$$

$$Q_{L_2} = d \cdot \text{Corr}(\delta\rho) \cdot \sin(\delta\phi_2 - B/2) + n_{QL_2} \quad (16)$$

Based on characteristics of the I and Q signals, the carrier-phase error can be directly extracted using the equation 17 below, and the code-phase error can be directly extracted using the equations 18–19 shown below:

$$\delta\tilde{\phi}_{ij} = \tan^{-1}(Q_{ij}/I_{ij}) \quad (17)$$

for $i^{th}$ satellite, and $j^{th}$ L frequency.

Note, this can be a Costa PLL (Phase Lock Loop) discriminator that is insensitive to data bits.

$$\delta\tilde{\rho}_{ij} = \left[\frac{Q_{E_{ij}} - Q_{L_{ij}}}{I_{E_{ij}} - I_{L_{ij}}}\right] \cdot \lambda_P \quad \text{or} \tag{18}$$

$$\delta\tilde{\rho}_{ij} = \left[\frac{\sqrt{Q_{E_{ij}}^2 + I_{E_{ij}}^2} - \sqrt{Q_{L_{ij}}^2 + I_{L_{ij}}^2}}{\sqrt{Q_{E_{ij}}^2 + I_{E_{ij}}^2} + \sqrt{Q_{L_{ij}}^2 + I_{L_{ij}}^2}}\right] \cdot \lambda_P \tag{19}$$

where $\delta\tilde{\rho}_{ij}$ is the "measured" code-phase error for an $i^{th}$ satellite vehicle and a $j^{th}$ satellite frequency.

GPS code and carrier raw measurements can be mathematically modeled in the following way:

$$\tilde{\rho}_{L1} = \rho + k_1 d_I + b_u + d_T + n_{\rho_{L1}} \tag{20}$$

$$\tilde{\rho}_{L2} = \rho + k_2 d_I + b_u + d_T + n_{\rho_{L2}} \tag{21}$$

$$\tilde{\phi}_{L1} = \rho + N_{L1}\lambda_{L1} - k_1 d_I + b_u + d_T + n_{\phi_{L1}} \tag{22}$$

$$\tilde{\phi}_{L2} = \rho + N_{L2}\lambda_{L2} - k_2 d_I + b_u + d_T + n_{\phi_{L2}} \tag{23}$$

where
 $\rho$ = actual distance from the satellite to the GPS receiver antenna;
 $d_I$ = frequency independent ionospheric delay;
 $d_T$ = tropospheric delay;
 $b_u$ = receiver (user) clock bias;
 n = noise + multipath;
 $k_1 = f_2^2/(f_2^2 - f_1^2) = 2.5463$;
 $k_2 = f_1^2/(f_2^2 - f_1^2) = 1.5463$; and
 N = carrier phase integer ambiguity.

Computed versions of the GPS code and carrier raw measurements can be represented as:

$$\hat{\rho}_{L1} = \hat{\rho} + k_1 \hat{d}_I + \hat{b}_u + \hat{d}_T \tag{24}$$

$$\hat{\rho}_{L2} = \hat{\rho} + k_2 \hat{d}_I + \hat{b}_u + \hat{d}_T \tag{25}$$

$$\hat{\phi}_{L1} = \hat{\rho} + \hat{N}_{L1} \cdot \lambda_{L1} - k_1 \hat{d}_I + \hat{b}_u + \hat{d}_T \tag{26}$$

$$\hat{\phi}_{L2} = \hat{\rho} + \hat{N}_{L2} \cdot \lambda_{L2} - k_2 \hat{d}_I + \hat{b}_u + \hat{d}_T \tag{27}$$

Measurement residuals provided to the phase-track filter can be defined in the following way:

$$\delta\rho_{L1} = (\delta\rho_{NAV} + \delta b_u + \delta d_T) + k_1 \delta d_I + n_{\rho_{L1}} \tag{28}$$

$$\delta\rho_{L2} = (\delta\rho_{NAV} + \delta b_u + \delta d_T) + k_2 \delta d_2 + n_{\rho_{L2}} \tag{29}$$

$$\delta\phi_{L1} = (\delta\rho_{NAV} + \delta b_u + \delta d_T) - k_1 \delta d_I + \lambda_{L1} \delta N_{L1} + n_{\rho_{L1}} \tag{30}$$

$$\delta\phi_{L2} = (\delta\rho_{NAV} + \delta b_u + \delta d_T) - k_2 \delta d_1 + \lambda_{L1} \delta N_{L1} + n_{\rho_{L2}} \tag{31}$$

where $\delta\rho_{NAV} = \rho - \hat{\rho}$ (due to nav error, assuming no satellite error) (32)

$$\delta d_I = d_I - \hat{d}_I \tag{33}$$

$$\delta d_T = d_T - \hat{d}_T \tag{34}$$

$$\delta b_u = b_u - \hat{b}_u \tag{35}$$

$$\delta N_{L1} = N_{L1} - \hat{N}_{L1} \tag{36}$$

$$\delta N_{L2} = N_{L2} - \hat{N}_{L2} \tag{37}$$

The states of the phase-track filter (per satellite) can be defined as:

$$\bar{x} = [\delta\rho \, \delta\dot{\rho} \, \delta\ddot{\rho} | \delta N_{L1} \, \delta N_{L2} | \delta d_I \, \delta\dot{d}_I]^T \tag{38}$$

where
 $\delta\rho$ = range error;
 $\delta\dot{\rho}$ = range error rate;
 $\delta\ddot{\rho}$ = range error acceleration;
 $\delta N_{L1}$ = L1 carrier integer ambiguity;
 $\delta N_{L2}$ = L2 carrier integer ambiguity;
 $\delta d_I$ = ionospheric delay; and
 $\delta\dot{d}_I$ = ionospheric delay rate.

The phase-track filter state and measurement equations can be represented in the following way:

$$\bar{x} = [\delta\rho \, \delta\dot{\rho} \, \delta\ddot{\rho} | \delta N_{L1} \, \delta N_{L2} | \delta d_I \, \delta\dot{d}_I]^T \tag{39}$$

$$\dot{\bar{x}} = A\bar{x} + B\bar{u} \tag{40}$$

where $$A = \begin{bmatrix} 0 & 1 & 0 & 0 & 0 & 0 & 0 \\ 0 & 0 & 1 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 1 \\ 0 & 0 & 0 & 0 & 0 & 0 & 0 \end{bmatrix}$$

$$\delta\tilde{\rho}_{L1} = [1 \; 0 \; 0 | 0 \; 0 | k_1 \; 0] \bar{x} = H_{\rho_{L1}} \bar{x} \tag{41}$$

$$\delta\tilde{\rho}_{L2} = [1 \; 0 \; 0 | 0 \; 0 | k_2 \; 0] \bar{x} = H_{\rho_{L2}} \bar{x} \tag{42}$$

$$\delta\tilde{\phi}_{L1} = [1 \; 0 \; 0 | 1 \; 0 | -k_1 \; 0] \bar{x} = H_{\phi_{L1}} \bar{x} \tag{43}$$

$$\delta\tilde{\phi}_{L2} = [1 \; 0 \; 0 | 1 \; 0 | -k_1 \; 0] \bar{x} = H_{\phi_{L2}} \bar{x} \tag{44}$$

In an exemplary embodiment, the phase track filter 148 can implemented using a linear Kalman filter having the following steps shown below.

In a first step, propagating the filter estimate to the current measurement time:

$$\bar{x}_{PTF} = \Phi_{PTF} \bar{x}_{PTF} = \begin{bmatrix} \delta\rho \\ \delta\dot{\rho} \\ \delta\ddot{\rho} \\ \delta N_{L1} \\ \delta N_{L2} \\ \delta d_I \\ \delta\dot{d}_I \end{bmatrix} \tag{45}$$

where
 $\delta\rho$ = range error;
 $\delta\dot{\rho}$ = range error rate;
 $\delta\ddot{\rho}$ = range error acceleration;
 $\delta N_{L1}$ = L1 carrier integer ambiguity;
 $\delta N_{L2}$ = L2 carrier integer ambiguity;
 $\delta d_I$ = ionospheric delay;
 $\delta\dot{d}_I$ = ionospheric delay rate; and
 $\Phi_{PTF}$ = state transition matrix of [A].

In a second step, the filter covariance is propagated to the current measurement time:

$$P_{PTF} = \Phi_{PTF} P^*_{PTF} \Phi_{PTF}^T + Q_{PTF} \quad (46)$$

where
$P^*_{PTF}$ = updated covariance at the previous measurement time; and
$Q_{PTF}$ = system model noise covariance.

In a third step, the measurement matrix is computed:

$$H = \begin{bmatrix} 1 & 0 & 0 & 0 & 0 & k_1 & 0 \\ 1 & 0 & 0 & 0 & 0 & k_2 & 0 \\ 1 & 0 & 0 & 1 & 0 & -k_1 & 0 \\ 1 & 0 & 0 & 0 & 1 & -k_1 & 0 \end{bmatrix} \quad (47)$$

In a fourth step, the measurement residual is computed:

$$\delta \bar{z}_{PTF} = \bar{z}_{PTF} - H \cdot \bar{x}_{PTF} \quad (48)$$

where $$\bar{z}_{PTF} = \begin{bmatrix} \delta \rho_{MEAS1} \\ \delta \rho_{MEAS2} \\ \delta \phi_{MEAS1} \\ \delta \phi_{MEAS2} \end{bmatrix} = \text{dicriminator output.} \quad (49)$$

In a fifth step, the covariance of the residual is computed:

$$S_{PTF} = H_{PTF} P_{PTF} H_{PTF}^T + R_{PTF} \quad (50)$$

where
$R_{PTF}$ = filter measurement variance.

In a sixth step, the Kalman Gain is computed:

$$G_{PTF} = P_{PTF} H_{PTF}^T S_{PTF}^{-1} \quad (51)$$

In a seventh step, the filter estimation is updated:

$$\bar{x}_{PTF} = \bar{x}_{PTF} + G_{PTF} \cdot \delta \bar{z}_{PTF} \quad (52)$$

In an eighth step, the filter covariance is updated:

$$P^*_{PTF} = (I - G_{PTF} H_{PTF}) P_{PTF} \quad (53)$$

In an exemplary embodiment, the phase track filter 148 can implemented using an extended Kalman filter implementation. The extended Kalman filter implementation can use as measurements the raw GPS receiver outputs (Is & Qs) instead of the discriminator outputs. Since the receiver outputs are modeled as nonlinear equations as shown in Equations (5)–(16), the filter measurement equations can be modeled as an extended Kalman filter format. In this option, the third and fourth steps above can be replaced with the following steps three and four below.

In a substitute third step, measurement matrices for the L1 and L2 frequencies are computed:

$$H_{L_1} = \begin{bmatrix} h_{IE_1\delta\rho} & 0 & 0 & h_{IE_1N_1} & 0 & h_{IE_1d_1} & 0 \\ h_{QE_1\delta\rho} & 0 & 0 & h_{QE_1N_1} & 0 & h_{QE_1d_1} & 0 \\ h_{IP_1\delta\rho} & 0 & 0 & h_{IP_1N_1} & 0 & h_{IP_1d_1} & 0 \\ h_{QP_1\delta\rho} & 0 & 0 & h_{QP_1N_1} & 0 & h_{QP_1d_1} & 0 \\ h_{IP_1\delta\rho} & 0 & 0 & h_{IL_1N_1} & 0 & h_{IL_1d_1} & 0 \\ h_{QL_1\delta\rho} & 0 & 0 & h_{QL_1N_1} & 0 & h_{QL_1d_1} & 0 \end{bmatrix} \quad (54)$$

$$H_{L_1} = \begin{bmatrix} h_{IE_2\delta\rho} & 0 & 0 & 0 & h_{IE_2N_2} & h_{IE_2d_1} & 0 \\ h_{QE_2\delta\rho} & 0 & 0 & 0 & h_{QE_2N_2} & h_{QE_2d_1} & 0 \\ h_{IP_2\delta\rho} & 0 & 0 & 0 & h_{IP_2N_2} & h_{IP_2d_1} & 0 \\ h_{QP_2\delta\rho} & 0 & 0 & 0 & h_{QP_2N_2} & h_{QP_2d_1} & 0 \\ h_{IP_2\delta\rho} & 0 & 0 & 0 & h_{IL_2N_2} & h_{IL_2d_1} & 0 \\ h_{QL_2\delta\rho} & 0 & 0 & 0 & h_{QL_2N_2} & h_{QL_2d_1} & 0 \end{bmatrix} \quad (55)$$

where $h_{IE_1\delta\rho} = d_1 \cdot \hat{C}'(\delta\rho + B/2) \cdot \cos(\delta\phi_1)$ $h_{QE_1\delta\rho} = d_1 \cdot \hat{C}'(\delta\rho + B/2) \cdot \sin(\delta\phi_1)$ $h_{IP_1\delta\rho} = d_1 \cdot \hat{C}'(\delta\rho) \cdot \cos(\delta\phi_1)$ $h_{QP_1\delta\rho} = d_1 \cdot \hat{C}'(\delta\rho) \cdot \sin(\delta\phi_1)$ $h_{IL_1\delta\rho} = d_1 \cdot \hat{C}'(\delta\rho - B/2) \cdot \cos(\delta\phi_1)$ $h_{QL_1\delta\rho} = d_1 \cdot \hat{C}'(\delta\rho - B/2) \cdot \sin(\delta\phi_1)$ $h_{IE_1N_1} = -d_1 \cdot \hat{C}(\delta\rho + B/2) \cdot \sin(\delta\phi_1)$ $h_{QE_1N_1} = d_1 \cdot \hat{C}(\delta\rho + B/2) \cdot \cos(\delta\phi_1)$ $h_{IP_1N_1} = -d_1 \cdot \hat{C}(\delta\rho) \cdot \sin(\delta\phi_1)$ $h_{QP_1N_1} = d_1 \cdot \hat{C}(\delta\rho) \cdot \cos(\delta\phi_1)$ $h_{IL_1N_1} = -d_1 \cdot \hat{C}(\delta\rho - B/2) \cdot \sin(\delta\phi_1)$ $h_{QL_1N_1} = d_1 \cdot \hat{C}(\delta\rho - B/2) \cdot \cos(\delta\phi_1)$ $h_{IE_1d_1} = k_1 \cdot (h_{IE_1\delta\rho} - h_{IE_1N_1})$ $h_{QE_1d_1} = k_1 \cdot (h_{QE_1\delta\rho} - h_{QE_1N_1})$ $h_{IP_1d_1} = k_1 \cdot (h_{IP_1\delta\rho} - h_{IP_1N_1})$ $h_{QP_1d_1} = k_1 \cdot (h_{QP_1\delta\rho} - h_{QP_1N_1})$ $h_{IL_1d_1} = k_1 \cdot (h_{IL_1\delta\rho} - h_{IL_1N_1})$ $h_{QL_1d_1} = k_1 \cdot (h_{QL_1\delta\rho} - h_{QL_1N_1})$ $h_{IE_2\delta\rho} = d_2 \cdot \hat{C}'(\delta\rho + B/2) \cdot \cos(\delta\phi_2)$ $h_{QE_2\delta\rho} = d_2 \cdot \hat{C}'(\delta\rho + B/2) \cdot \sin(\delta\phi_2)$ $h_{IP_2\delta\rho} = d_2 \cdot \hat{C}'(\delta\rho) \cdot \cos(\delta\phi_2)$ $h_{QP_2\delta\rho} = d_2 \cdot \hat{C}'(\delta\rho) \cdot \sin(\delta\phi_2)$ $h_{IL_2\delta\rho} = d_2 \cdot \hat{C}'(\delta\rho - B/2) \cdot \cos(\delta\phi_2)$ $h_{QL_2\delta\rho} = d_2 \cdot \hat{C}'(\delta\rho - B/2) \cdot \sin(\delta\phi_2)$ $h_{IE_2N_2} = -d_2 \cdot \hat{C}(\delta\rho + B/2) \cdot \sin(\delta\phi_2)$ $h_{QE_2N_2} = d_2 \cdot \hat{C}(\delta\rho + B/2) \cdot \cos(\delta\phi_2)$ $h_{IP_2N_2} = -d_2 \cdot \hat{C}(\delta\rho) \cdot \sin(\delta\phi_2)$ $h_{QP_{21}N_{21}} = d_2 \cdot \hat{C}(\delta\rho) \cdot \cos(\delta\phi_2)$ $h_{IL_2N_2} = -d_2 \cdot \hat{C}(\delta\rho - B/2) \cdot \sin(\delta\phi_2)$ $h_{QL_{21}N_{21}} = d_2 \cdot \hat{C}(\delta\rho - B/2) \cdot \cos(\delta\phi_2)$ $$h_{IE_2d_1} = k_2 \cdot (h_{IE_2\delta\rho} - h_{IE_2N_2})$$

$$h_{QE_2d_1} = k_2 \cdot (h_{QE_2\delta\rho} - h_{QE_2N_2})$$

$$h_{IP_2d_1} = k_2 \cdot (h_{IP_2\delta\rho} - h_{IP_2N_2})$$

$$h_{QP_2d_1} = k_2 \cdot (h_{QP_2\delta\rho} - h_{QP_2N_2})$$

$$h_{IL_2d_1} = k_2 \cdot (h_{IL_2\delta\rho} - h_{IL_2N_2})$$

$$h_{QL_2d_1} = k_2 \cdot (h_{QL_2\delta\rho} - h_{QL_2N_2})$$

In a substitute fourth step, the measurement residuals for the L1 and L2 frequencies are computed:

$$\delta \bar{z}_{PTF_1} = \begin{bmatrix} I_{E1} \\ Q_{E1} \\ I_{P1} \\ Q_{P1} \\ I_{L1} \\ Q_{L1} \end{bmatrix} - H_{L_1} \cdot \bar{x}_{PTF} \quad (56)$$

$$\delta \bar{z}_{PTF_2} = \begin{bmatrix} I_{E2} \\ Q_{E2} \\ I_{P2} \\ Q_{P2} \\ I_{L2} \\ Q_{L2} \end{bmatrix} - H_{L_2} \cdot \bar{x}_{PTF} \quad (57)$$

For either of the linear Kalman filter and extended Kalman filter implementation described above with respect to the phase track filter 148, the phase track filter can be simplified by deleting the ionospheric delay rate state.

The navigation filter 150 can be a conventional Kalman filter, or any other appropriate or suitable filter that will perform the functions described herein, where the measurements are the range errors and range rate errors from the individual phase-track filters (such as the filter 148). These measurements can, for example, be sampled at 10 Hz. These measurements are the direct residuals from the predicted raw measurements. The raw measurement prediction module 136 predicts the expected pseudo-ranges and their rates at a rate of the NCO command rate (e.g., at 100 Hz) using the navigation data (provided from the navigation equations module 152), satellite ephemeredes, and the estimated values of tropospheric delay, ionospheric delay and clock bias. With the predicted data, NCO (Numerically Controlled Oscillator) commands are computed for the receiver correlation process 102. The receiver generates the resultant Is and Qs based on the code/carrier correlation, for example at 100 Hz. Therefore, the measurements provided by the phase track filter 148 to the navigation filter 150 are the residuals of the navigation filter 150. Additionally, the measurement variance is the covariance of the phase track filter 148.

In an exemplary embodiment, the states of the navigation filter can be: Position Errors (3); Velocity Errors (3); Attitude Errors (3); Accelerometer Biases (3); Accelerometer Scale Factor Errors (3); Gyro Drifts (3); User Receiver Clock Bias; Frequency; and Frequency-rate (3).

In an exemplary embodiment, the navigation equations (152) are implemented with a conventional attitude and velocity integration technique. In an exemplary embodiment, the high frequency IMU outputs are accumulated, for example down to 100 Hz delta-velocity and delta-attitude samples, with sculling and coning compensations. The position, velocity, and attitude are integrated, for example at 100 Hz, and are stored in a buffer memory for the time-alignment of the navigation data and GPS measurements. If a set of corrections is available from the navigation filter, the IMU data is compensated/corrected as well as the position, velocity, and attitude of the GPS receiver.

In an exemplary embodiment, the tropospheric delay model or estimator 134 can provide tropospheric delay estimations in accordance with conventional or known processes. For example, the estimator 134 can include a mathematical model that is based on a geographic location or region where the system is being used, and on the season in which the system is being used.

In an exemplary embodiment, the GPS receiver raw measurement prediction module 136 is implemented using conventional processes, and computes the predicted raw measurements of pseudo-range and pseudo-range rate. Predictions can be computed/supplied to the Code NCO Commands and Carrier NCO Commands modules 138, 140 at any appropriate rate, for example at a rate of 100 Hz. In an exemplary embodiment, computation of the commands within the modules 138, 140 can be performed using known algorithms and techniques.

Exemplary embodiments can provide, for example, the following advantages. First, processing burden is reduced. A conventional pre-filter requires twelve states for each satellite in track for dual-frequency operation—L1 code range error, L1 carrier phase error, L1 carrier phase rate error, L1 carrier phase acceleration error, L1 signal amplitude error, L2 code range error, L2 carrier phase error, L2 carrier phase rate error, L2 carrier phase acceleration error, L2 signal amplitude error, total electron content error, and total electron content rate error. In contrast, exemplary embodiments of the phase-track filter described herein, use only seven states (range error, range error rate, range error acceleration, L1 carrier integer ambiguity, L2 carrier integer ambiguity, ionospheric delay error, and ionospheric delay error rate) and have a significantly reduced processing burden. The processing burden can be reduced further if the filter state for the ionospheric delay rate is eliminated. The delay is usually a slowly changing variable. The reduced processing burden allows the navigation filter to be updated at a higher rate, for example at 10 Hz rather than 1 Hz. Second, ionospheric delay can be estimated with greater accuracy and/or speed. Third, GPS receiver clock drift can be estimated with greater accuracy and/or speed by allowing the navigation filter to operate at a higher rate. Fourth, signal tracking is improved due to more accurate aiding data.

The methods, processes, logics and techniques described above can be implemented in a variety of programming styles (for example Structured Programming, Object-Oriented Programming, and so forth) and in a variety of different programming languages (for example Java, C, C++, C#, Pascal, Ada, and so forth). In addition, those skilled in the art will appreciate that the elements and methods or processes described herein can be implemented using a microprocessor, computer, or any other computing device, and can be implemented in hardware and/or software, in a single physical location or in distributed fashion among various locations or host computing platforms. Agents or modules can be implemented in hardware and/or software or computer program(s) at any desired or appropriate location.

Those skilled in the art will also appreciate that software or computer program(s) can be stored on a machine-readable medium, wherein the software or computer program(s) includes instructions for causing a computing device such as a computer, computer system, microprocessor, or other computing device, to perform the methods or processes.

The present invention can be embodied in other specific forms without departing from the spirit or essential characteristics thereof, and the invention is not limited to the specific embodiments described herein. The presently disclosed embodiments are illustrative and not restrictive. The scope is indicated by the appended claims rather than the foregoing description, and all changes within the meaning and range and equivalents thereof are intended to be embraced therein.

What is claimed is:

1. A method for tracking signals transmitted from satellites and containing digital codes, comprising:
    receiving at a receiver first and second signals transmitted by a first satellite;
    tracking the first and second signals using a first filter to measure a range error, a range error rate, a range error acceleration, a carrier integer ambiguity of the first signal, a carrier integer ambiguity of the second signal, and an ionospheric delay error;
    calculating navigational and timing errors based on an output of a second filter operating on the range error rate and range error acceleration measurements output from the first filter and inertial measurement signals output from an inertial measurement unit (IMU); and
    adjusting the tracking of the first and second signals based on outputs from the first filter and the calculated navigational and timing errors.

2. The method of claim 1, comprising:
    providing the range error and the range error rate measurements output from the first filter to the second filter configured to measure position errors, velocity errors, attitude errors, accelerometer biases, accelerometer scale factor errors, gyro drifts, a receiver clock bias, a receiver clock frequency, and a receiver frequency rate;
    estimating errors in a clock of the receiver based on the output of the second filter and the inertial measurements taken with respect to the receiver; and
    based on the outputs of the first filter, the estimated clock errors, status information regarding the first satellite, and tropospheric delay information, adjusting the tracking of the first and second signals.

3. The method of claim 1, wherein the tracking includes using the first filter to measure an ionospheric delay error rate.

4. A satellite signal tracker, comprising:
    at least one clock circuit arranged to synchronize a received satellite signal with a replica signal;
    a first filter arranged to filter a received satellite signal, wherein the first filter measures states of range error, range error rate, range error acceleration, carrier integer ambiguity of the first signal, carrier integer ambiguity of the second signal, ionospheric delay error, and ionospheric delay error rate;
    a second filter arranged to filter the range error and the range error rate measurements output from the first filter and inertial measurement signals output from an inertial measurement unit (IMU); and
    a feedback circuit arranged to adjust the clock circuit based on data output from the first filter and the second filter.

5. The tracker of claim 4,
wherein the second filter is configured to measure states of position errors, velocity errors, attitude errors, accelerometer biases, accelerometer scale factor errors, gyro drifts, a receiver clock bias, a receiver clock frequency, and a receiver frequency rate, wherein the tracker comprises:
    a first processing circuit arranged to process data output from the second filter together with the inertial measurement signals regarding a reception location of the satellite signal; and
    a second processing circuit arranged to adjust the clock circuit based on data output from the first processing circuit and the first filter.

6. A satellite signal tracker, comprising:
    at least one clock circuit arranged to synchronize a received satellite signal with a replica signal;
    a first filter arranged to filter a received satellite signal, wherein the first filter measures states of range error, range error rate, range error acceleration, carrier integer ambiguity of the first signal, carrier integer ambiguity of the second signal, and ionospheric delay error;
    a second filter arranged to filter the range error and the range error rate measurements output from the first filter and inertial measurement signals output from an inertial measurement unit (IMU); and
    a feedback circuit arranged to adjust the clock circuit based on data output from the first filter and the second filter.

* * * * *